(12) United States Patent
Beerends et al.

(10) Patent No.: US 7,016,814 B2
(45) Date of Patent: Mar. 21, 2006

(54) METHOD AND DEVICE FOR DETERMINING THE QUALITY OF A SIGNAL

(75) Inventors: John Gerard Beerends, Hengstdijk (NL); Andries Pieter Hekstra, Terheijden (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 10/130,593

(22) PCT Filed: Dec. 11, 2000

(86) PCT No.: PCT/EP00/12535

§ 371 (c)(1),
(2), (4) Date: Aug. 28, 2002

(87) PCT Pub. No.: WO01/52600

PCT Pub. Date: Jul. 19, 2001

(65) Prior Publication Data

US 2003/0055608 A1    Mar. 20, 2003

(30) Foreign Application Priority Data

Jan. 13, 2000   (NL) .................................. 1014075

(51) Int. Cl.
*H04R 29/00*   (2006.01)

(52) U.S. Cl. .................... 702/189; 702/69; 702/81; 702/182; 702/199; 704/200.1

(58) Field of Classification Search ............... 702/57, 702/66, 69, 71, 75, 81, 82, 124, 182, 189, 702/190, 198, 199; 704/200.1, 219, 230
See application file for complete search history.

(56) References Cited

U.S. PATENT DOCUMENTS

| | | | | |
|---|---|---|---|---|
| 4,662,222 A | * | 5/1987 | Johnson | 73/602 |
| 5,268,834 A | * | 12/1993 | Sanner et al. | 700/31 |
| 5,621,854 A | * | 4/1997 | Hollier | 704/200.1 |
| 5,848,384 A | * | 12/1998 | Hollier et al. | 704/231 |
| 5,862,262 A | * | 1/1999 | Jacobs et al. | 382/249 |

(Continued)

FOREIGN PATENT DOCUMENTS

EP     0869685 A2 * 10/1998

(Continued)

OTHER PUBLICATIONS

Sporer et al., "Evaluating a Measurement System", http://www.zainea.com/evaluating.htm. 16 pages, no date.*

(Continued)

*Primary Examiner*—Marc S. Hoff
*Assistant Examiner*—Jeffrey R West
(74) *Attorney, Agent, or Firm*—Michaelson & Associates; Peter L. Michaelson

(57) ABSTRACT

According to an objective measurement technique for determining the quality of an output signal (X(t)) of an audio or voice signals-processing and/or -transporting system, the output signal and a reference signal (Y(t)) are mapped on representation signals (R(X), R(Y)) of a suitably chosen perception model. A differential signal (D(t)) of the representation signals is averaged, in a time-averaging device, in two steps by two averaging members connected in series, over time, whereby a quality signal Q is generated. The time averaging is carried out by the first and second averaging members at the local and the global levels, respectively, using various averaging functions, e.g., preferably Lebesgue paveraging functions having various p-values p1>p2. The invention advantageously provides a high correlation between a generated quality signal Q and the human quality perception, even in the event of brief disturbances.

6 Claims, 2 Drawing Sheets

U.S. PATENT DOCUMENTS

Figure 1:
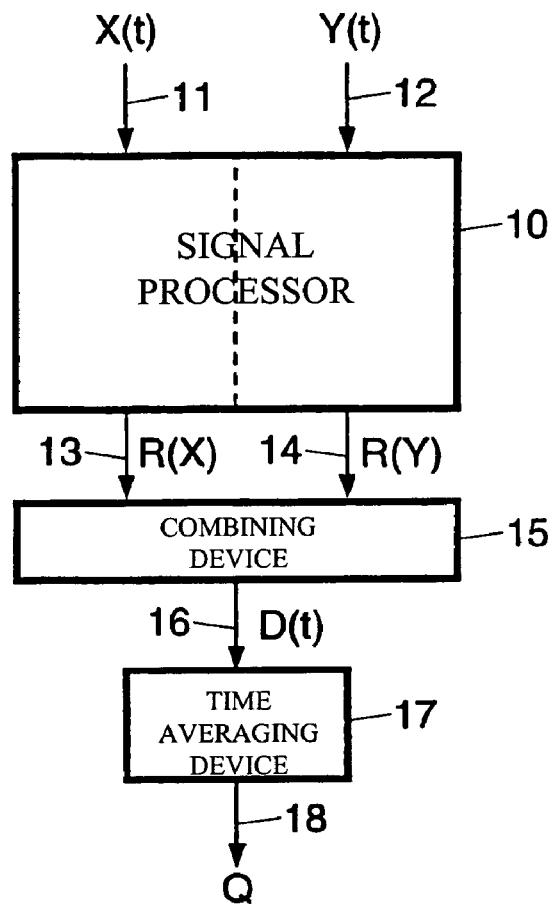

| | | | | |
|---|---|---|---|---|
| 5,991,459 | A | * | 11/1999 | Fogel .......................... 382/264 |
| 5,999,900 | A | * | 12/1999 | Hollier ....................... 704/228 |
| 6,229,479 | B1 | * | 5/2001 | Kozlov et al. ......... 342/357.06 |
| 6,271,771 | B1 | * | 8/2001 | Seitzer et al. .................. 341/50 |
| 6,349,309 | B1 | * | 2/2002 | Aggarwal et al. ........... 707/200 |
| 6,499,009 | B1 | * | 12/2002 | Lundberg et al. ........... 704/211 |
| 6,609,092 | B1 | * | 8/2003 | Ghitza et al. ............... 704/226 |
| 6,683,991 | B1 | * | 1/2004 | Andrew et al. ............. 382/240 |
| 2003/0055608 | A1 | * | 3/2003 | Beerends et al. ........... 702/189 |

FOREIGN PATENT DOCUMENTS

| | | | |
|---|---|---|---|
| GB | 2356455 A | * | 5/2001 |
| WO | WO 96/28950 | | 9/1996 |
| WO | WO 96/28953 | | 9/1996 |
| WO | WO 97/44779 | | 11/1997 |
| WO | WO 9744779 A1 | * | 11/1997 |
| WO | WO-9744779 A1 | * | 11/1997 |
| WO | WO 9945715 A1 | * | 9/1999 |
| WO | WO-9945715 A1 | * | 9/1999 |

OTHER PUBLICATIONS

IPEDIA Internet Encyclopedia, "Lebesgue measure", www.ipedia.com/lebesgue__measure.html.*

IBM Technical Disclosure Bulletin—NN87091838, "Noise Adaptive Acoustic Spectral Prototypes for Recognition", Sep. 1, 1987.*

* cited by examiner

METHOD AND DEVICE FOR DETERMINING THE QUALITY OF A SIGNAL

A. BACKGROUND OF THE INVENTION

The invention lies in the area of quality measurement of sound signals, such as audio and voice signals. More in particular, it relates to a method and a device for determining, according to an objective measurement technique, the quality of an output signal from a signal-processing system with respect to a reference signal according to the preamble of claim 1 and claim 7, respectively. A method and a device of such type are known, e.g., from References [1,–,6] (for more bibliographic details on the References, see below under C. References). According to the present known technique, an output signal from an audio or voice signals-processing and/or transporting system, whose signal quality is to be determined, and a reference signal, are mapped on representation signals according to a psycho-physical perception model of the human hearing. As a reference signal, an input signal of the system applied with the output signal obtained may be used, as in References [1,–,5]. But as a reference signal such as, e.g., disclosed in Reference [6], there may also be applied an estimate of the original input signal, reconstructed from the output signal. Subsequently, a differential signal is determined as a function of time from said representation signals, which, according to the model used, is representative of a disturbance sustained in the system present in the output signal. The time-dependent differential signal, hereinafter also referred to as a disturbance signal, may be a difference signal or a ratio signal, or also a combination of both, and constitutes a time-dependent expression for the extent to which, according to the representation model, the output signal deviates from the reference signal. Finally, the disturbance signal is averaged over time, a time-independent quality signal being obtained, which is a measure of the quality of the auditive perception of the output signal.

It is a known phenomenon that, when listening to an audio signal, a short disturbance therein already has a significant influence on the quality perception of the entire signal. This applies not only to spoken words and music, but in general for the reproduction of sound signals. Upon application of the customary linear time averaging, in such cases there is a poor correlation between human quality perception and the quality signal obtained by way of the measurement technique. Application of the "root mean square" as a time-averaging function admittedly provides some improvement, but even then the correlation is still too low for a good operation of the objective method.

B. SUMMARY OF THE INVENTION

The object of the invention is, inter alia, to provide for a method and a device of the above type, with which a high correlation may be achieved between the human quality perception of an output signal and a quality signal obtained by way of the measurement technique, particularly in cases where the above phenomenon occurs. Considerations on which the invention is based, are the following. The linear time averaging referred to above and the "root mean square" are actually special cases of the Lebesgue p-averaging function or Lebesgue p-norm (Lp norm), for p=1 and p=2, respectively. For this norm function it applies that for an increasing p the value of the norm ever more approaches the maximum of the function f within the interval. The effect of applying the Lp norm as an averaging function on the disturbance signal is therefore that, in the event of an increasing p, the higher signal values of the disturbance signal over the averaging interval are counted ever more dominantly in the averaging result.

In the present quality-measurement technique, it is customary to use test signals of spoken sentences comprising two sentences or parts thereof and taking approx. 10 seconds. Here, it may be recognised that, in the event of spoken words, a syllable (having an average duration of approx. 0.3 s) is not intelligible when, in the voice signal, part of the syllable is disturbed. This signifies that in a disturbance signal comprising a signal part forming a representation of a disturbance signal of such a disturbed syllable, such signal part may be locally replaced by an averaged signal value which exceeds a signal value obtained by way of a linear averaging, in order to extract information relevant to the determination of the quality. Said higher average signal value may be obtained, e.g., by applying an Lp having a relatively high p-norm [sic] on said signal part. At the sentence level, however, a second sentence or part thereof continues to be intelligible, if only the intelligibility of a preceding first sentence or part thereof is affected by disturbance, in such a manner that for time averaging an averaging function may be applied corresponding to, or at least deviating less from, the linear averaging, such as, e.g., an Lp norm having a relatively low p, e.g., p=1 or p=2.

The invention idea proper, which is also applicable more in general to arbitrary audio signals, now includes the application, instead of the known singular time averaging, a dual or 2-stage time averaging. Said 2-stage time averaging comprises two substeps: a first substep in which the time-dependent disturbance signal obtained in the combination step is subjected, first at the local level, i.e., over relatively small time intervals, to a first averaging function, an average value being obtained per the first time interval; and a second substep in which average values obtained in the first substep are subjected to a second averaging function over the entire signal duration. The first averaging function differs from the second averaging function and therewith deviates more strongly from the linear averaging than the second averaging function.

According to the invention, the method and the device of the above kind therefore have the characteristic of claim 1, and the characteristic of claim 6, respectively.

In first preferred embodiments of the method and the device, averaging functions are applied which are based on an Lp norm, namely, in the first substep an Lp norm having a relatively high p-value, and in the second substep an Lp norm having a relatively low p-value. For this purpose, the method and the device are preferably characterised according to claims 3 and 7, respectively.

Further preferred embodiments of the method and the device according to the invention are summarised in the subclaims.

C. REFERENCES

[1] Beerends J. G., Stemerdink J. A., "A perceptual audio quality meassure based on a psychoacoustic sound representation", J. Audio Eng. Soc., Vol. 40, No. 12, December 1992, pp. 963–978;
[2] WO-A-96/28950;
[3] WO-A-96/28952;
[4] WO-A-96/28953;
[5] WO-A-97/44779;
[6] WO-A-96/06496.

All References are considered as being incorporated into the present application.

D. BRIEF DESCRIPTION OF THE DRAWING

Figure 3:
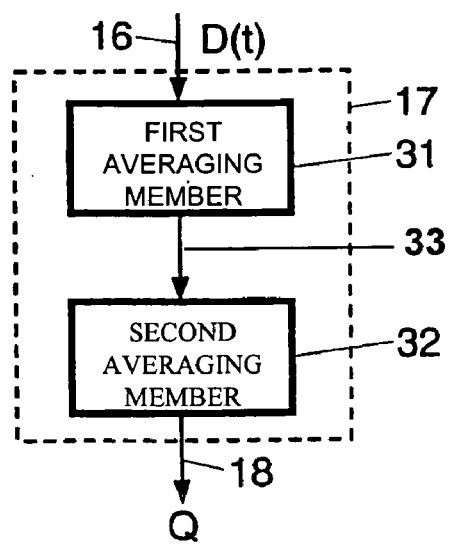
Figure 2:
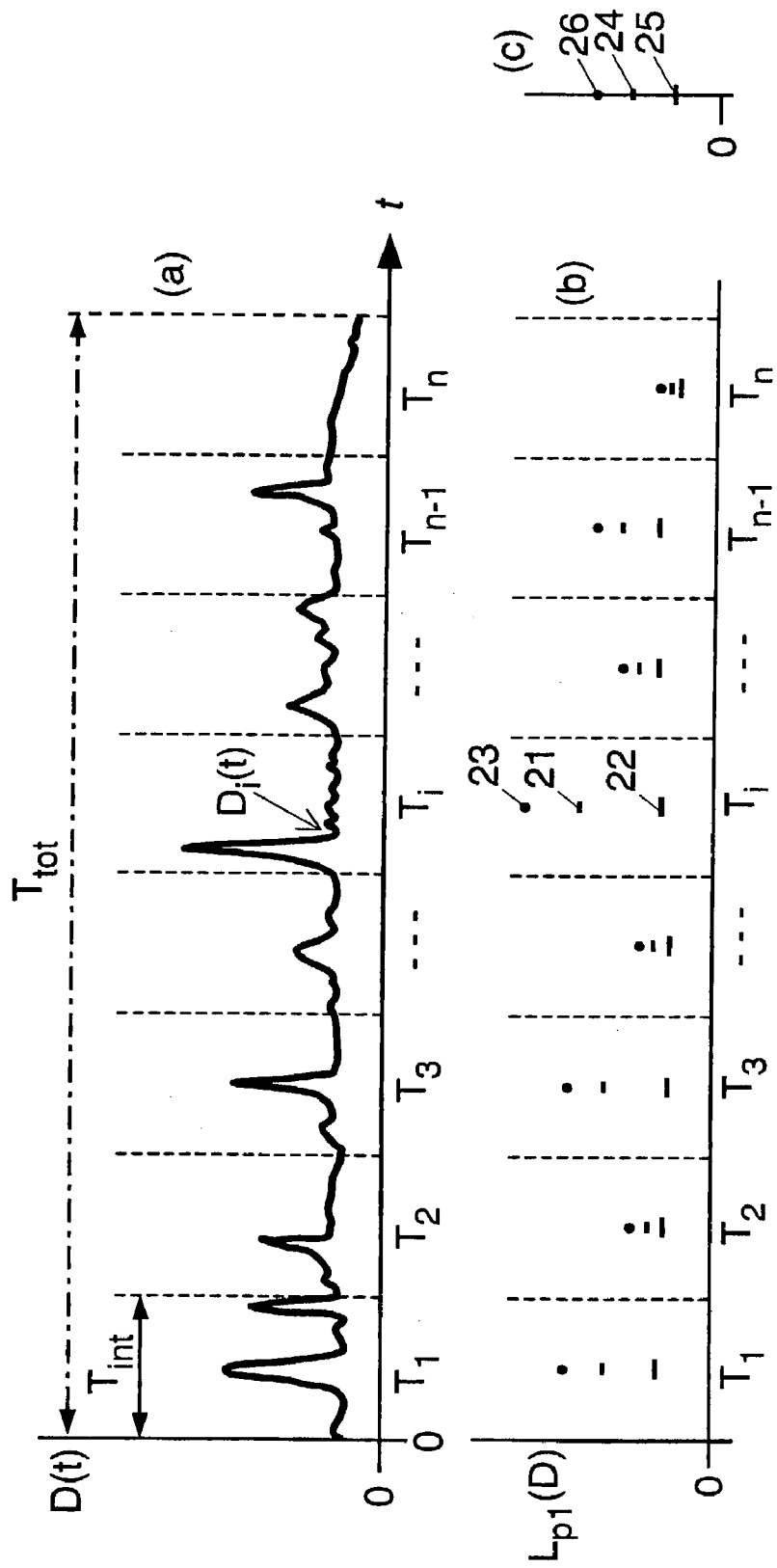

The invention will be set forth in further detail by way of a description of an exemplary embodiment, reference being made to a drawing comprising the following figures:

FIG. 1 schematically shows a known device for determining the quality of a sound signal;

FIG. 2 shows, in parts (a), (b) and (c), graphic representations for the benefit of the explanation of the time-averaging step in the method according to the invention: in part (a), a graphic representation having an example of a disturbance signal as a function of time, broken down into subsignals per interval; in part (b), a graphic representation of average signal values of the subsignals per interval obtained in a first substep of the time-averaging step; and in part (c), a graphic representation of several quality-signal values obtained in a second substep of the time-averaging step;

FIG. 3 schematically shows a time-averaging device modified according to the invention for application in a device according to FIG. 1.

E. DESCRIPTION OF AN EXEMPLARY EMBODIMENT

FIG. 1 schematically shows a known measurement device for determining the quality of a sound signal. The measurement device comprises a signal processor 10 having signal inputs 11 and 12, and having signal outputs coupled, by way of signal couplings 13 and 14, to signal inputs of a combining device 15. The combining device 15 is provided with a signal output which, by way of a signal coupling 16, is coupled to a signal input of a time-averaging device 17. The time-averaging device 17 is provided with a signal output 18 which in addition forms the output of the measurement device.

Said known measurement device roughly operates as follows. On the signal inputs 11 and 12 of the signal processor 10, an input signal X(t), of which the signal quality is to be determined, and a reference signal Y(t), respectively, are offered. The input signal X(t) is an output signal of an audio or voice signals-processing and/or -transporting system (not shown), whose signal-processing and/or -transporting quality is to be investigated. The signal processor 10 processes the signals X(t) and Y(t), and generates representation signals R(X) and R(Y) which form representations of the signals offered X(t) and Y(t) according to a perception model of the human hearing laid down in (the hardware and/or software of) the signal processor. In most cases, the representation signals are functions of time and frequency (Hz scale or Bark scale). The representation signals R(X) and R(Y) are passed through, by the signal processor 10 by way of the signal couplings 13 and 14, respectively, to the combining device 15. In the combining device 15, under the execution of various operations on the representation signals, such as comparison, scaling, determination of a ratio signal or an absolute-difference signal, and integration over the frequency, a time-dependent disturbance signal D(t) is generated, which is offered to the time-averaging device 17 by way of the signal coupling 16. In the time-averaging device, the disturbance signal D(t) is averaged over time by carrying out an integration according to time over the duration in time of the signal, the result of said time averaging becoming available, as a quality signal Q, at the signal output 18 of the time-averaging device. The time-independent quality signal Q constitutes a measure for the quality of the auditive perception of the signal X(t). As a time averaging, the linear time averaging is customary, i.e., the integration of the disturbance signal D(t) over time, divided by the total time duration of the signal (see, e.g., Appendix F of Reference [1], pp. 977/8). By such a time averaging, however, brief disturbances in a sound signal, which may have a significant effect on the quality perception of the entire signal, are averaged out. In cases taking place, such may result in a poor correlation between the human quality perception and the quality signal obtained by way of the measurement technique. In the event of applying the "root mean square" as a time-averaging function, a correlation is obtained, which is still too low for a sound operation of the objective method.

The linear time averaging and the "root mean square" are actually specific cases of the Lebesgue p-averaging function or Lebesgue p-norm (Lp norm):

$$L_p(f) = \|f\|_p = (\int_{(a,b)} |f(\mu)|^p d\mu)^{1/p} \quad \{1\}$$

for a function f integrable over a specific interval (a, b) having a measure $\mu$, and:

$$L_p(f) = \|f\|_p = \left(\sum_{(a,b)}^{n} \frac{1}{n} |f(x_i)|^p \right)^{1/p} \quad \{2\}$$

for a function f defined in n discrete points $x_i$(i=1, ... , n) in the interval (a, b), for p=1 and p=2, respectively. For said norm, it applies that for increasing p, the value of the norm ever more approaches the maximum $f_{max}$ of the function f within the interval, and that in the limit for p→∞, it applies that $L_\infty(f) = f_{max}$. The effect of applying such a norm function as an averaging function on (part of) a disturbance signal therefore is that, for increasing p, the higher signal values of the disturbance signal over the averaging interval are ever more dominantly counted in the averaging result. In the Lp norm generally it applies that $p \in \Re$. However in the context of the present invention $p \in \Re_{(+)}$ is more sensible.

In order to prevent averaging out the influence of relatively brief disturbances in the final quality signal, the time-averaging step is carried out in two substeps, which are explained with reference to FIG. 2. In said two substeps, two different averaging functions are applied to the disturbance signal one after the other, which are chosen in such a manner that the first averaging function in the first substep has higher (signal) values of the disturbance signal over an averaging interval more dominantly counted in the averaging result than the second averaging function. In general, such pairs of averaging functions may be determined by individual selection, e.g., using simulation. When applying the Lp norm as an averaging function, it is only required in the first substep to choose an Lp norm having a p-value which is, e.g., a number of times larger than the p-value of the Lp norm applied in the second substep. Since the Lp norm is based on a specific form of convex functions, namely, the function $g(x)=|x|^p$ for p=1, 2, ... , having as its inverse function $g^{-1}(x)=|x|^{1/p}$, it may be expected that in the general class of convex functions other suitable pairs may be found. The following, more general forms of the formulas (1) and (2) for averaging function or norm are associated:

$$L_g(f) = \|f\|_g = g^{-1}\left(\int_{(a,b)} g(|f(\mu)|)d\mu\right) \text{ and} \quad \{1a\}$$

$$L_g(f) = \|f\|_g = g^{-1}\left(\sum_{(a,b)} \sum_{i=1}^{n} \frac{1}{n} g(|f(x_i)|)\right) \quad \{2a\}$$

Suitable functions, on which the averaging functions in the first and the second averaging steps may be based, are, e.g., $g_1(x)=\exp(px)$ with $p=1, 2, \ldots$, having as its inverse function $g_1^{-1}(x)=p^{-1}\ln(x)$ in the first step, in combination with in the second step $g_2(x)=|x|$ of $g_2(x)=|x|^2$. It should be noted therefore that, although in the further description for simplicity's sake use is made only of the Lp norm as an averaging function, this does not signify that the invention is limited to this purpose.

In part (a) of FIG. 2, an example is offered of a disturbance signal D(t) as a function of time, the time being plotted along the horizontal axis and (the intensity of) the signal D(t) being plotted along the vertical axis. In a first substep, the total time duration $T_{tot}$ of the signal D(t) is first broken down into n intervals $T_i$ (i=1,–,n) of preferably equal time duration $T_{int}$, and the signal D(t) proper broken down into signal parts having a signal part $D_i(t)$ per interval $T_i$. Subsequently, in each interval $T_i$ (i=1,–,n) a time average is determined according to the Lp norm (see formula {1}) of the signal part $D_i(t)$ at a first, relatively high p-value $p_1$ (e.g., $p_1$=6). In this connection, it should be noted, that only by way of example the disturbance signal D(t) has been represented as a continuous function. It is customary that the signal D(t) becomes available as a time-discrete function at the output of the combining device 15 in the form of a time-sequential row of values, e.g., twenty per time interval, which may be interpreted as sampling points of a continuous function. In this case, the Lp norm is determined using formula {2}. The values of the time averages, $L_{p1}(D_i)$ for i=1,–,n, are represented for each interval $T_i$ in part (b) of FIG. 2, designated by a short horizontal dash 21. For comparison's sake, in each interval the values are also represented of the time averages for $p_1$=1 and $P_1$=∞, i.e., $L_1(D_i)$ and $L_\infty(D_i)$, respectively designated by a long horizontal dash 22 and by a dot 23.

In a second substep, the $L_p$ norm of the values $L_{p1}(D_i)$ determined per interval $T_i$ over the total time duration $T_{tot}$ according to formula {2} with a second, relatively low p-value $p_2<p_1$ (e.g., $p_2$=1 or 2), which results in the quality signal Q. Part (c) of FIG. 2 shows the average value over the n intervals according to the norm $L_{p2}$ for $P_2$=1 of the values $L_{p1}(D_i)$, $L_1(D_i)$ and $L_\infty(D_i)$, respectively designated by a short horizontal dash 24, by a long horizontal dash 25 and by a dot 26. The value of Q as designated by dash 25, and therefore obtained via a 2-step averaging with p-values $p_1=p_2=1$, substantially corresponds to the value obtained by way of the known singular time averaging wherein the $L_1$ norm is applied. This signifies that the improvement of the correlation envisaged by the invention may be achieved only if $p_1>p_2$.

If it is simple in the first substep to determine the maximum of the signal parts $D_i(t)$ in each interval $T_i$, e.g., $p_i=\_$ is chosen. In the second substep, the choice of $p_2$=1 is the most simple one.

It should be understood that, when using such a 2-step time averaging, the effect of brief disturbances on the eventual quality signal continues to be significant. For test signals on spoken words, a total time duration $T_{tot}$ of approx. 10 s is indicative, it being possible to assume, for $T_{int}$, the average duration of a spoken syllable, i.e., approx. 0.3 s.

Apart from variation of the p-value, particularly in the first substep, the effect of brief disturbances may also be manipulated by a suitable choice of the duration of the time interval $T_i$, e.g., as a function of the kind of signal, e.g., spoken words or music, or of the kind of signal, slow or fast, but also as a function of the type of audio or voice signals-processing and/or -transporting system of which X(t) is the output signal. It has already been mentioned above that, in the event of a test signal with spoken words, the average duration of a syllable is approx. 0.3 s. Said average, however, may vary considerably in the event of sentences pronounced deliberately slow or fast, as the case may be. Something similar may apply to musical signals having a slow or fast rhythm, as the case may be.

Another option of manipulating the effect of brief disturbances is by choosing the intervals overlapping, as a result of which the effect of brief disturbances, which are present exactly on the interval boundaries, are better taken into account. Such an overlap is, e.g., 10%, the next interval $T_{i+1}$ beginning at 0.9 of the interval $T_i$, or also 50%, the next interval $T_{i+1}$ already beginning halfway through the interval $T_i$.

When listening to a sound signal, the part of the sound signal heard most recently generally has a greater effect on the quality perception than the first-heard part thereof. To have such an effect better expressed in the quality signal, too, in the second substep a weighed average may be applied by making use of a weighing function w(t), whether discrete or not, such as a monotone increasing, at any rate not decreasing, function having values between 0 and 1 over the total signal duration $T_{tot}$, for which, e.g., there applies:

$$0 \leq w(t) \leq \frac{1}{2} \text{ for } t \leq \frac{1}{2}T_{tot}, \text{ and}$$

$$\frac{1}{2} \leq w(t) \leq 1 \text{ for } \frac{1}{2}T_{tot} \leq t \leq T_{tot},$$

there being allocated, to each interval $T_i$, a weight $w_i$ which is equal to, e.g., the maximum of w(t) in the interval $T_i$. In this connection, the norm function of formula {2} is adjusted to:

$$L_p(f) = \|f\|_p = \left(\frac{\sum_{i=1}^{n} |f(x_i)|^p w_i}{\sum_{i=1}^{n} w_i}\right)^{1/p} \quad \{2'\}$$

The time-averaging device 17, as schematically shown in FIG. 3, according to the invention consists of two averaging members 31 and 32. A first averaging member 31 receives, by way of the signal coupling 16, the disturbance signal D(t) from the combining device 15, and processes said received signal according to the first substep described above. In it, the signal D(t) is first broken down over n intervals $T_i$ with i=1,–,n of the total signal duration $T_{tot}$ of the signal D(t), into n subsignals $D_i(t)$, which are subsequently converted into a time-sequential row of time-averaged signal values $L_{p1}(D_i)$, determined per time interval $T_i$ using an Lp norm having the relatively high p-value $p_1$. Said row of signal values $L_{p1}(D_i)$ is passed on, by way of a signal coupling 33, to the second averaging member 32. The second averaging member determines, of said row of average signal values $L_{p1}(D_i)$, an average signal value $L_{p2}(L_{p1}(D))$ according to an Lp norm having a relatively low p-value $p_2$ according to formula {2} or {2'}. The average signal value $L_{p2}(L_{p1}(D))$ is subsequently delivered, by the second averaging member 32, as the quality signal Q determined, to the signal output 18 of the time-averaging device.

The invention claimed is:

1. A method for determining, according to an objective measurement technique, quality of an output signal of a signal processing system with respect to a reference signal, the method comprising the steps of:

processing the output signal and, in response thereto, generating a first representation signal;

processing the reference signal and, in response thereto, generating a second representation signal; and combining the first and second representation signals so as to determine a differential signal as a function of time; and averaging the differential signal over time so as to generate a time-independent quality signal, wherein the averaging step comprises the steps of:

determining, in each time interval of a series of consecutive time intervals occurring over a time duration of the differential signal, first signal averages of the differential signal according to a first Lebesgue p-averaging function; and determining, over said time duration of the differential signal, a second signal average as an average of the first signal averages according to a second Lebesgue p-averaging function different from the first averaging function so as to result in the second signal average being the time-independent quality signal, wherein the first and second Lebesgue p-averaging functions are functions having p values p1 and p2, respectively, with p1>p2.

2. The method according to claim 1 wherein p1=∞ and p2=1.

3. The method according to claim 1 wherein the series of consecutive time intervals are intervals which overlap with one another.

4. The method according to claim 1 wherein the second averaging function comprises a weighted averaging function.

5. Apparatus for determining, according to an objective measurement technique, quality of an output signal of a signal-processing system with respect to a reference signal, wherein the apparatus comprises:

a signal-processing device for processing the output signal and the reference signal and, in response thereto, for generating first and second representation signals; and a combination circuit for combining the first and second representation signals so as to determine a differential signal as a function of time;

a time-averaging device for generating, in response to the differential signal, a time-independent quality signal, said time-averaging device comprising:

a first averaging member for determining, in each time interval of a series of consecutive time intervals occurring over a signal duration of the differential signal, first signal averages of the differential signal according to a first Lebesgue p-averaging function; and a second averaging member for determining, from the first signal averages, a second signal average, according to a second Lebesgue p-averaging function differing from the first averaging function, and for delivering the second signal average as the time-independent quality signal, wherein the first and second Lebesgue p-averaging functions are functions having p values p1 and p2, respectively, with p1>p2.

6. The apparatus according to claim 5 wherein p1=∞ and p2=1.

* * * * *